United States Patent
Murata

(10) Patent No.: US 9,388,064 B2
(45) Date of Patent: Jul. 12, 2016

(54) TEMPERED GLASS AND MANUFACTURING METHOD FOR THE SAME

(75) Inventor: Takashi Murata, Otsu (JP)

(73) Assignee: NIPPON ELECTRIC GLASS CO., LTD., Shiga (JP)

(\*) Notice: Subject to any disclaimer, the term of this patent is extended or adjusted under 35 U.S.C. 154(b) by 310 days.

(21) Appl. No.: 12/461,055

(22) Filed: Jul. 30, 2009

(65) Prior Publication Data

US 2009/0325776 A1    Dec. 31, 2009

Related U.S. Application Data

(63) Continuation-in-part of application No. PCT/JP2009/060431, filed on Jun. 8, 2009.

(30) Foreign Application Priority Data

Jun. 27, 2008  (JP) ................................. 2008-168653

(51) Int. Cl.
- *C03C 3/093* (2006.01)
- *C03C 21/00* (2006.01)
- *C03B 17/06* (2006.01)
- *C03C 3/11* (2006.01)

(52) U.S. Cl.
CPC ............... *C03B 17/06* (2013.01); *C03C 3/093* (2013.01); *C03C 3/11* (2013.01); *C03C 21/002* (2013.01); *Y10T 428/315* (2015.01)

(58) Field of Classification Search
USPC .................................. 501/56, 66, 68–70, 72
See application file for complete search history.

(56) References Cited

U.S. PATENT DOCUMENTS

| | | | | |
|---|---|---|---|---|
| 4,015,045 | A * | 3/1977 | Rinehart | 428/410 |
| 5,277,946 | A * | 1/1994 | Nagai et al. | 428/426 |
| 5,446,008 | A | 8/1995 | Krolla et al. | |
| 5,785,726 | A | 7/1998 | Dorfeld et al. | |
| 5,824,127 | A | 10/1998 | Bange et al. | |
| 5,900,296 | A * | 5/1999 | Hayashi | C03C 3/087 428/410 |
| 6,128,924 | A | 10/2000 | Bange et al. | |
| 6,333,285 | B1 * | 12/2001 | Chopinet et al. | 501/69 |
| 6,518,211 | B1 | 2/2003 | Bradshaw et al. | |
| 2002/0193232 | A1 | 12/2002 | Itoh et al. | |
| 2005/0096209 | A1 * | 5/2005 | Kase et al. | 501/56 |
| 2005/0209084 | A1 | 9/2005 | Takaya et al. | |
| 2006/0063009 | A1 | 3/2006 | Naitou et al. | |
| 2006/0242995 | A1 | 11/2006 | Bookbinder et al. | |
| 2007/0149380 | A1 | 6/2007 | Dorfeld et al. | |
| 2008/0020919 | A1 * | 1/2008 | Murata | 501/66 |
| 2008/0286548 | A1 * | 11/2008 | Ellison et al. | 428/220 |
| 2009/0000335 | A1 | 1/2009 | Urata et al. | |
| 2010/0087307 | A1 * | 4/2010 | Murata et al. | 501/67 |

FOREIGN PATENT DOCUMENTS

| | | |
|---|---|---|
| CN | 1377844 A | 11/2002 |
| EP | 1 593 657 | 11/2005 |
| EP | 1 790 620 | 5/2007 |
| EP | 2 000 440 | 12/2008 |
| JP | 7-172862 | 7/1995 |
| JP | 8-48537 | 2/1996 |
| JP | 2001-500098 | 1/2001 |
| JP | 2002-174810 | 6/2002 |
| JP | 2005-15328 | 1/2005 |
| JP | 2005-306719 | 11/2005 |
| JP | 2006-83045 | 3/2006 |
| JP | 2008-105860 | 5/2008 |
| JP | 2010-30876 | 2/2010 |
| JP | 2012-87040 | 5/2012 |
| WO | 98/03442 | 1/1998 |
| WO | 2007/111079 | 10/2007 |
| WO | WO 2008149858 A1 * | 12/2008 |

OTHER PUBLICATIONS

International Preliminary Report on Patentability together with English translation of Written Opinion issued Feb. 17, 2011 in corresponding International (PCT) Application No. PCT/JP2009/060431.
International Search Report issued Jul. 14, 2009 in International (PCT) Application No. PCT/JP2009/060431.
Tetsuo Izumitani et al., "New Glass and Physical Properties Thereof", First edition, Management System Laboratory. Co., Ltd., Aug. 20, 1984, p. 451-498.
Chinese Office Action issued Jul. 1, 2014 in corresponding Chinese Application No. 201210436254.9 (with partial English translation).

\* cited by examiner

*Primary Examiner* — David Sample
(74) *Attorney, Agent, or Firm* — Wenderoth, Lind & Ponack, L.L.P.

(57) ABSTRACT

A tempered glass of the present invention having a compression stress layer is characterized in that a β-OH value is 0.01 to 0.5/mm. Here, the "β-OH value" is a value obtained from the following equation by measuring the transmittance of glass by FT-IR.

β-OH value=$(1/X)\log 10(T_1/T_2)$

X: thickness of glass (mm)
$T_1$: transmittance (%) at a reference wavelength of 3,846 $cm^{-1}$
$T_2$: minimum transmittance (%) at a hydroxyl group absorption wavelength of around 3,600 $cm^{-1}$.

21 Claims, No Drawings

TEMPERED GLASS AND MANUFACTURING METHOD FOR THE SAME

CROSS-REFERENCE TO RELATED APPLICATION

This is a continuation-in-part of international application PCT/JP2009/060431 filed Jun. 8, 2009, and claiming the priority of Japanese application 2008-168653 filed Jun. 27, 2008.

TECHNICAL FIELD

The present invention relates to a tempered glass, and more specifically, to a tempered glass which is suitable for use as cover glass for mobile phones, digital cameras, portable digital assistants (PDAs), touch panel displays, and solar cells, a protective substrate for displays, or a substrate for displays.

BACKGROUND ART

Devices such as mobile phones, digital cameras, PDAs, or touch panel displays show a tendency of further prevalence.

Hitherto, an acrylic resin substrate has been used as cover glass for displays in those applications. However, because the acrylic resin substrate has a low Young's modulus, when a display was pressed, for example, with a finger, there was a case where the acrylic resin substrate bends and comes into contact with the display, thereby causing a display failure. Further, the acrylic resin substrate is easily scratched and therefore, its visibility is apt to degrade.

When a glass substrate is used as a protective member, the above problems can be solved. When the glass substrate is used as the protective member, the following properties are required for the glass substrate:

(1) the glass substrate must have high mechanical strength;
(2) the glass substrate must have small variations in strength;
(3) the glass substrate can be supplied in large quantities at a low cost; and
(4) the glass substrate must be excellent in bubble quality.

Heretofore, to meet the above requirement (1), a glass substrate tempered by ion exchange or the like (so called "tempered glass substrate") is used (refer to Patent Document 1 and Non-patent Document 1).

PRIOR ART DOCUMENTS

Patent Documents

Patent Document 1: JP 2006-83045 A
Patent Document 2: JP 2001-500098 A
Patent Document 3: JP 2008-105860 A
Patent Document 4: JP 07-172862 A
Non-patent Document 1: Tetsuro Izumitani et al., "New glass and physical properties thereof", First edition, Management System Laboratory. Co., Ltd., Aug. 20, 1984, p. 451-498

SUMMARY OF THE INVENTION

Problems to be Solved by the Invention

When the compression stress value of a compressed stress layer formed on the surface of the tempered glass is increased and the depth of the compression stress layer is made deep, the mechanical strength of the glass can be enhanced.

However, it is difficult to achieve a large compression stress value and form a deep compression stress layer at the same time. To obtain the deep compression stress layer, ion exchange temperature must be made high, or ion exchange time must be prolonged. However, the compression stress value becomes small when the above process is carried out.

Heretofore, to solve the above-mentioned problem, the introduction of a component for improving ion exchange performance, such as $Al_2O_3$ or $ZrO_2$, into a glass composition has been studied. However, when a large amount of one of those components is contained, the devitrification proof of glass is apt to lower. Therefore, there is limitation to the addition amounts of those components.

In particular, in the case of an overflow down-draw process, because the viscosity of molten glass is high at the time of forming, when the devitrification proof of glass is low, glass is apt to devitrify at the time of forming a glass substrate, whereby the production efficiency and surface quality of the glass substrate tend to lower. Meanwhile, in a forming method such as a float process, because the viscosity of molten glass is low at the time of forming, the above-mentioned problem hardly occurs. However, in the case of the float process, to obtain a glass substrate having high surface accuracy, the surface of the glass substrate must be polished after forming. When the surface of the glass substrate is polished, a fine defect is readily formed on the surface of the glass substrate, thereby making it difficult to retain the mechanical strength of the glass substrate.

It is therefore a technical object of the present invention to improve the mechanical strength of tempered glass by improving the ion exchange performance while retaining the devitrification proof of glass.

Means for Solving the Problem

The inventor of the present invention has conducted various studies and has found that the water content of glass, that is, the β-OH value of glass has an influence upon the compression stress value and thickness of a compression stress layer and that the ion exchange performance can be improved while devitrification proof is retained when the above value is limited to a predetermined range. Those findings are proposed as the present invention. That is, the tempered glass of the present invention having a compression stress layer is characterized in that the β-OH value is 0.01 to 0.5/mm.

Here, the "β-OH value" is a value obtained from the following equation by measuring the transmittance of glass by FT-IR.

$$\beta\text{-OH value} = (1/X)\log 10(T_1/T_2)$$

X: thickness of glass (mm)
$T_1$: transmittance (%) at a reference wavelength of 3,846 $cm^{-1}$
$T_2$: minimum transmittance (%) at a hydroxyl group absorption wavelength of around 3,600 $cm^{-1}$ The β-OH value can be increased by (1) selecting a raw material having a high water content (for example, a hydroxide raw material), (2) adding water to the raw material, (3) reducing the amount of a component (such as Cl or $SO_3$) for reducing the water content of glass or not using the component, (4) employing oxygen combustion at the time of melting glass or introducing steam directly into a melting furnace to increase the water content in the atmosphere in the furnace, (5) carrying out steam bubbling in molten glass, or (6) using a large-sized melting furnace or reducing the flow rate of molten glass. Therefore, it is possible to reduce the β-OH value by carrying out the opposite operations to the above operations (1) to (6). That is, the β-OH value can be reduced by (7) selecting a raw material having a low water content, (8) adding no water to the raw material, (9) increasing the amount of a component (such as Cl or $SO_3$) for reducing the water content of glass, (10) reducing the water content in the atmosphere in the furnace, (11) carrying out $N_2$ bubbling in molten glass, or (12) using a small-sized melting furnace or increasing the flow rate of molten glass.

Although the conventional tempered glass has a β-OH value in glass of more than 0.5/mm, the β-OH value can be reduced to 0.5/mm or less by suitably combining the above operations (7) to (12).

It should be noted that Patent Documents 2 and 3 are prior arts for limiting the β-OH value in glass. Patent Documents 2 and 3 disclose a technology for limiting the β-OH value in glass in order to increase the fining property of glass. However, Patent Documents 2 and 3 are utterly silent about the limitation of the β-OH value in glass in order to increase the mechanical strength of glass.

Patent Document 4 describes that high conductivity can be obtained by controlling the water content of glass. However, Patent Document 4 is utterly silent about the limitation of the β-OH value in glass in order to increase the mechanical strength of glass and does not take forming by the overflow down-draw process into consideration at all. It should be noted that Patent Document 4 is a prior art which relates to a glass ceramic which is easily devitrified.

In the above-mentioned invention, the tempered glass is characterized by having a β-OH value of 0.4/mm or less.

In the above-mentioned invention, the tempered glass is characterized by having a content of $SO_3$+Cl (total amount of $SO_3$ and Cl) of 0.0001 to 0.5 mass % in a glass composition. In this way, the water content in the glass is remarkably decreased.

In the above-mentioned invention, the tempered glass is characterized in that a compression stress value of the compression stress layer is 300 MPa or more and a thickness of the compression stress layer (depth of compression stress) is 1 μm or more.

In the above-mentioned invention, the tempered glass is characterized by comprising, as a glass composition, in terms of mass %, 45 to 75% of $SiO_2$, 0 to 25% of $Al_2O_3$, and 0 to 30% of $Li_2O+Na_2O+K_2O$. (total amount of $Li_2O$, $Na_2O$, and $K_2O$).

In the above-mentioned invention, the tempered glass is characterized by comprising, as a glass composition, in terms of mass %, 45 to 75% of $SiO_2$, 3 to 25% of $Al_2O_3$, and 1 to 25% of $Li_2O+Na_2O+K_2O$.

In the above-mentioned invention, the tempered glass is characterized by comprising, as a glass composition, in terms of mass %, 50 to 75% of $SiO_2$, 10 to 22% of $Al_2O_3$, 0 to 5% of $B_2O_3$, 8 to 15% of $Na_2O$, 0 to 6% of $K_2O$, and 0 to 10% of MgO+CaO+SrO+BaO (total amount of MgO, CaO, SrO, and BaO).

In the above-mentioned invention, the tempered glass is characterized by having a strain point of 450° C. or higher. Here, the "strain point" refers to a value measured based on a method according to ASTM C336.

In the above-mentioned invention, the tempered glass is characterized by having a thermal expansion coefficient of 60 to $110\times10^{-7}$/° C. Here, the "thermal expansion coefficient" refers to a value of an average thermal expansion coefficient in the temperature range of from 30 to 380° C. measured by using a dilatometer.

In the above-mentioned invention, the tempered glass is characterized by having a liquidus temperature of 1,200° C. or lower. Here, a glass powder passing through a standard sieve of 30 mesh (mesh opening 500 μm) and remaining on 50 mesh (mesh opening 300 μm) is placed in a platinum boat, and is kept in a temperature gradient furnace for 24 hours, and then, the crystal thereof deposits. The temperature at this stage is referred to as "liquidus temperature".

In the above-mentioned invention, the tempered glass is characterized by having a liquidus viscosity of $10^{4.0}$ dPa·s or more. Here, "liquidus viscosity" refers to a value in which the viscosity of a glass at the liquidus temperature is measured using a platinum sphere pull up method.

In the above-mentioned invention, the tempered glass is characterized by having a substrate shape.

In the above-mentioned invention, the tempered glass is characterized by having an unpolished surface.

In the above-mentioned invention, the tempered glass is characterized by being used as a substrate for a display.

In the above-mentioned invention, the tempered glass is characterized by being used as a cover glass of a touch panel display.

In the above-mentioned invention, the tempered glass is characterized by being used as a cover glass of a mobile phone.

In the above-mentioned invention, the tempered glass is characterized by being used as a substrate or a cover glass of a solar battery.

Further, a tempered glass of the present invention is characterized by comprising as a glass composition, in terms of mass %, 45 to 75% of $SiO_2$, 3 to 25% of $Al_2O_3$, 0 to 10% of $B_2O_3$, 8 to 20% of $Na_2O$, and 0 to 10% of $K_2O$, and having a β-OH value of 0.01 to 0.5/mm.

Further, a method of producing a tempered glass of the present invention is characterized by comprising: melting a glass raw material which is prepared to comprise, as a glass composition, in terms of mass %, 45 to 75% of $SiO_2$, 3 to 25% of $Al_2O_3$, 0 to 10% of $B_2O_3$, 8 to 20% of $Na_2O$, and 0 to 10% of $K_2O$, and to have a β-OH value of 0.01 to 0.5/mm; forming the resultant into a substrate shape; and performing an ion exchange treatment to form a compression stress layer on the glass. The conditions of the ion exchange treatment are not particularly limited and may be determined in view of the viscosity characteristics of glass. In particular, when the K ion contained in a $KNO_3$ molten salt is ion-exchanged with a Na component contained in the glass substrate, the compression stress layer can be formed efficiently on the surface of glass.

In the above-mentioned invention, the method of producing a tempered glass is characterized in that the forming the resultant into a substrate shape is performed by a down draw method.

In the above-mentioned invention, the method of producing a tempered glass is characterized in that the forming the resultant into a substrate shape is performed by an overflow down draw method.

BEST MODE FOR CARRYING OUT THE INVENTION

The tempered glass of the present invention has a compression stress layer. The method of forming the compression stress layer on a glass includes a physical tempering method laminating method and a chemical tempering method. For the tempered glass of the present invention, a compression stress layer is formed preferably by a chemical tempering method. The chemical tempering method is a method of introducing alkali ions having large ion radius onto the surface of a glass substrate by ion exchanging at a temperature lower than a strain point of the glass. When a compression stress layer is formed by the chemical tempering method, the ion exchange treatment can be performed successfully even if the plate thickness of the glass substrate is small, and desired mechanical strength can be obtained. Further, when a compression stress layer is formed by the chemical tempering method, the glass substrate is not broken easily even if the glass substrate is cut after being tempered, which is different from the case of a physical tempering method such as an air cooling tempering method.

The tempered glass of the present invention has a β-OH value of 0.01 to 0.5/mm. When the β-OH value is smaller than 0.01/mm, the meltability of glass degrades, thereby reducing the productivity of a glass substrate. Therefore, the lower limit of the β-OH value is 0.01/mm, preferably 0.02/mm, more preferably 0.03/mm, much more preferably 0.05/mm. When the β-OH value is larger than 0.5/mm, the network structure of glass is readily damaged, whereby stress in glass is easily alleviated. That is, when the ion exchange temperature is raised or the ion exchange time is prolonged, the compression stress of the compression stress layer is easily alleviated, thereby making it difficult to increase the compression stress value of the compression stress layer. As a result, it is difficult to increase the mechanical strength of the tempered glass. Therefore, the upper limit of the β-OH value is 0.5/mm, preferably 0.45/mm, more preferably 0.4/mm, much more preferably 0.35/mm, ideally 0.3/mm, more ideally 0.25/mm, much more ideally 0.2/mm, most ideally 0.18/mm.

When Cl is added to the glass composition in an amount of 0.001 to 0.5 mass % (preferably 0.005 to 0.3 mass %, more preferably 0.01 to 0.2 mass %, much more preferably 0.01 to 0.1 mass %, particularly preferably 0.01 to 0.09 mass %), the β-OH value in glass is easily reduced. When the content of Cl is lower than 0.001 mass %, the β-OH value is hardly reduced. On the other hand, when the content of Cl is higher than 0.5 mass %, metal wiring is readily eroded at the time of forming a metal wiring pattern or the like on the tempered glass.

When $SO_3$ is added to the glass composition in an amount of 0.0001 to 0.1 mass % (preferably 0.0003 to 0.08 mass %, more preferably 0.0005 to 0.05 mass %, much more preferably 0.001 to 0.03 mass %), the β-OH value in glass is easily reduced. When the content of $SO_3$ is lower than 0.0001 mass %, the β-OH value is hardly reduced. On the other hand, when the content of $SO_3$ is higher than 0.1 mass %, $SO_3$ reboils at the time of melting glass, whereby bubble quality is apt to degrade.

When Cl and $SO_3$ are introduced into the glass composition, even if a hydroxide raw material or the like having high meltability is used as a glass raw material, the β-OH value in glass can be reduced. Therefore, ion exchange performance can be improved while the meltability of glass is improved.

In the tempered glass of the present invention, the compression stress value of the compression stress layer is preferably 50 MPa or more, more preferably 100 MPa or more, more preferably 200 MPa or more, more preferably 300 MPa or more, more preferably 500 MPa or more, much more preferably 600 MPa or more, particularly preferably 700 MPa or more. As the compression stress increases, the mechanical strength of glass becomes higher. When extremely large compression stress is generated on the surface of glass, a microcrack is produced on the surface of the substrate, whereby the strength of glass may lower. When extremely large compression stress is generated on the surface of glass, tensile stress existent within the glass substrate may become extremely high. Therefore, the compression stress of the compression stress layer is preferably set to 1,300 MPa or less. The compression stress value of the compression stress layer can be increased by reducing the β-OH value or by increasing the contents of $Al_2O_3$, $TiO_2$, $ZrO_2$, MgO, and ZnO and reducing the contents of SrO and BaO in the glass composition. Further, the compression stress value of the compression stress layer can be increased by shortening the ion exchange time or reducing the ion exchange temperature.

The thickness of the compression stress layer is preferably 3 μm or more, more preferably 5 μm or more, much more preferably 10 μm or more, ideally 20 μm or more, more ideally 30 μm or more, most ideally 40 μm or more. As the thickness of the compression stress layer becomes larger, glass is more hardly broken even when glass is deeply scratched. However, because glass becomes hard to cut, the thickness of the compression stress layer is preferably 100 μm or less. When the β-OH value is reduced, or the contents of $Al_2O_3$, $TiO_2$, $ZrO_2$, MgO, and ZnO in the glass composition are increased and the contents of SrO and BaO are reduced, the thickness of the compression stress layer can be made large. Further, when the ion exchange time is prolonged or the ion exchange temperature is raised, the thickness of the compression stress layer can be made large.

The value obtained by multiplying the compression stress value of the compression stress layer by its thickness is 5,000 (MPa·μm) or more, preferably 10,000 (MPa·μm) or more, more preferably 20,000 (MPa·μm) or more, much more preferably 25,000 (MPa·μm) or more, particularly preferably 28,000 (MPa·μm) or more, most preferably 30,000 (MPa·μm) or more. As the value becomes larger, the mechanical strength of glass becomes higher. When the value is too large, tensile stress which is generated within glass becomes too large. Therefore, the value obtained by multiplying the compression stress value of the compression stress layer by the thickness is 100,000 (MPa·μm) or less, preferably 80,000 (MPa·μm) or less, more preferably 60,000 (MPa·μm) or less, particularly preferably 50,000 (MPa·μm) or less.

The tensile stress value within glass calculated from the following equation is preferably 200 MPa or less (desirably 150 MPa or less, more preferably 100 MPa or less, more preferably 50 MPa or less, more preferably 40 MPa or less, much more preferably 30 MPa or less). As the value becomes smaller, the probability that glass is broken by a defect within glass becomes lower. However, when the value is made extremely small, the compression stress value and thickness of the compression stress layer on the surface of glass are apt to become small. Therefore, the tensile stress value within glass is preferably 1 MPa or more, more preferably 10 MPa or more, much more preferably 15 MPa or more. As referred to hereinafter, compression stress value and thickness of compression stress layer can be detected by using a surface stress meter (for example, FSM-6000, manufactured by Orihara Corporation). In a case where compression stress is too small to be observed by FSM-6000 and the like, a glass substrate may be observed by a polarization microscope from the cross-sectional direction thereof to detect the maximum value of tensile stress value within glass.

Tensile stress value within glass=(compression stress value of compression stress layer×thickness of compression stress layer)/(thickness of substrate−thickness of compression stress layer×2)

When the tempered glass of the present invention is used as a substrate, the thickness of the substrate is preferably 3.0 mm or less (desirably 1.5 mm or less, more preferably 0.7 mm or less, much more preferably 0.5 mm or less, particularly preferably 0.3 mm or less). As the thickness of the glass substrate becomes smaller, the glass substrate can be made lighter in weight. Even when the thickness of the glass substrate is made thin, the tempered glass of the present invention has an advantage that the glass is hardly broken. That is, as the thickness of the glass substrate is smaller, the effect of the present invention is obtained more easily. When the glass is formed by the overflow down-draw process, a thin glass substrate can be obtained without polishing.

When the tempered glass of the present invention is used as a substrate, it preferably has an unpolished surface, and the average surface roughness (Ra) of the unpolished surface is 10 Å or less, preferably 5 Å or less, more preferably 2 Å or less. The term "average surface roughness (Ra)" is a value measured in accordance with the "method of measuring the surface roughness of an FPD glass substrate" specified in SEMI D7-97. Although the theoretical strength of glass is inherently very high, glass is broken even with much lower stress than the theoretical strength in many cases. This is because a small defect called "Griffith flow" is produced on the surface of the glass substrate in the step after the forming of glass, for example, the polishing step. Therefore, when the surface of the tempered glass substrate is unpolished, the inherent mechanical strength of the glass substrate is hardly impaired, and the glass substrate is hardly broken. Further, when the surface of the glass substrate is unpolished, the polishing step can be eliminated from the manufacturing process of the glass substrate, thereby making it possible to reduce the production cost of the glass substrate. In the tempered glass of the present invention, when the both surfaces of the glass substrate are wholly unpolished, the glass substrate is more hardly broken. Further, in the tempered glass of the present invention, to prevent breakage from the cut surface of the glass substrate, the cut surface of the glass substrate may be chamfered, for example. An unpolished glass substrate having high surface accuracy can be obtained when forming is carried out by the overflow down-draw process.

Preferably, the tempered glass of the present invention contains, in terms of mass %, 45 to 75% of $SiO_2$, 0 to 25% of $Al_2O_3$, and 0 to 30% of $Li_2O+Na_2O+K_2O$ as the glass composition. In the tempered glass of the present invention, the reason that the glass composition is limited to the above is given below.

$SiO_2$ is a component forming a network of glass, and content thereof is 45 to 75%, preferably 50 to 75%, more preferably 50 to 70%, still more preferably 50 to 66%, particularly preferably 50 to 60%. When the content of $SiO_2$ is too large, melting and forming of the glass become difficult, and, in addition, the thermal expansion coefficient of the glass becomes too small, and matching of the thermal expansion coefficient with those of peripheral materials becomes difficult. On the other hand, when the content of $SiO_2$ is too small, glass formation becomes difficult. Further, the thermal expansion coefficient of the glass becomes too large, and the thermal shock resistance of the glass tends to lower.

$Al_2O_3$ is a component enhancing ion exchange performance. It has also an effect of enhancing the strain point and the Young's modulus of glass, and the content thereof is 1 to 25%. When the content of $Al_2O_3$ is too large, a devitrified crystal tends to deposit in the glass and it becomes difficult to form a glass substrate by an overflow down draw method and the like. Further, when the content of $Al_2O_3$ is too large, the thermal expansion coefficient of the glass becomes too small, and matching of the thermal expansion coefficient with those of peripheral materials becomes difficult, and the viscosity of the glass rises, and it becomes difficult to melt the glass. On the other hand, when the content of $Al_2O_3$ is too small, there occurs a possibility of no manifestation of a sufficient ion exchange performance. Comprehensively judging the above-mentioned viewpoints, it is more preferred that the upper limit of the suitable range of $Al_2O_3$ be in the range of 23% or less, 22% or less, 20% or less, 19% or less, or 18% or less. It is more preferred that the lower limit of $Al_2O_3$ be in the range of 3% or more, 5% or more, 12% or more, 13% or more, or 14% or more.

$Li_2O+Na_2O+K_2O$ is an ion exchange component, and also is a component lowering the viscosity of a glass to improve the meltability and the formability of the glass. When the content of $Li_2O+Na_2O+K_2O$ is too large, the glass tends to be devitrified. In addition, the thermal expansion coefficient of the glass increases too much, and hence, the thermal shock resistance of the glass lowers, and matching of the thermal expansion coefficient with those of peripheral materials becomes difficult. Further, when the content of $Li_2O+Na_2O+K_2O$ is too large, the strain point of the glass is lowered too much and therefore, it may become difficult to obtain high compression stress values. Further, when the total content of $Li_2O+Na_2O+K_2O$ is too large, viscosity at around the liquidus temperature lowers, whereby it may be difficult to ensure a high liquidus viscosity. Therefore, the total content of $Li_2O+Na_2O+K_2O$ is 30% or less, preferably 25% or less, more preferably 20% or less. When the total content of $Li_2O+Na_2O+K_2O$ is too low, the ion exchange performance and the meltability of glass may degrade. Therefore, the total content of $Li_2O+Na_2O+K_2O$ is 8% or more, preferably 10% or more, more preferably 13% or more, much more preferably 15% or more.

$Li_2O$ is an ion exchange component, which also lowers the viscosity of glass to improve the meltability and the formability of the glass. Further, $Li_2O$ is a component enhancing the Young's modulus. In addition, $Li_2O$ has a high effect of enhancing the compression stress value among alkali metal oxides. However, when the content of $Li_2O$ is too large, the liquidus viscosity lowers and the glass tends to be devitrified, and, in addition, the thermal expansion coefficient of the glass increases too much, and hence, the thermal shock resistance of the glass lowers and matching of the thermal expansion coefficient with those of peripheral materials becomes difficult. Further, the low-temperature viscosity lowers too much, and hence, stress relaxation tends to occur, and the compression stress value, on the contrary, lowers in some cases. Thus, the content of $Li_2O$ is 0 to 10% (preferably 0 to 8%, 0 to 6%, 0 to 4%, 0 to 3%, 0 to 2%, or particularly 0 to 1%).

$Na_2O$ is an ion exchange component, which also lowers the viscosity of glass to improve the meltability and the formability thereof and improves the devitrification proof of the glass. The content of $Na_2O$ is 3 to 20% (preferably 5 to 20%, 8 to 20%, 8 to 18%, 8 to 16%, 8 to 15%, 9 to 15%, 10 to 15%, and 11 to 15%). When the content of $Na_2O$ is too large, the thermal expansion coefficient of the glass becomes too large, and hence, the thermal shock resistance of the glass lowers, and matching of the thermal expansion coefficient with those of peripheral materials becomes difficult. In addition, when the content of $Na_2O$ is too large, the strain point may lower too much and a balance of the glass composition may deteriorate, thereby deteriorating, on the contrary, the devitrification proof of the glass. On the other hand, when the content of $Na_2O$ is too small, the meltability of the glass lowers, thermal expansion coefficient of the glass lowers too much, and the ion exchange performance deteriorates.

$K_2O$ is a component which promotes ion exchange, and shows a high effect of increasing the thickness of a compression stress layer, among alkali metal oxides. Further, $K_2O$ is a component which lowers viscosity to enhance the meltability and the formability of the glass. Further, $K_2O$ is also a component improving devitrification proof. The content of $K_2O$ is 0 to 10%. When the content of $K_2O$ is too large, the thermal expansion coefficient of glass becomes large, the thermal shock resistance of the glass lowers, and matching of the thermal expansion coefficient with those of peripheral materials becomes difficult. Further, when the content of $K_2O$ is too large, there are tendencies that the strain point lowers too much, and a balance of the glass composition may deteriorate, thereby deteriorating, on the contrary, the devitrification proof of the glass. Taking the above points into consideration, it is preferred that the upper limit range of the $K_2O$ be 10% or less (desirably 8% or less, 7% or less, 6% or less, or 5% or less). To make the compression stress layer deep, the lower limit range of $K_2O$ is preferably 0.1% or more (more preferably 0.5% or more, 1% or more, or 2% or more).

The tempered glass of the present invention may be composed of only the above components but another component may be added in an amount of up to 40% as long as the characteristic properties of glass are not greatly impaired.

MgO+CaO+SrO+BaO is a component for reducing the viscosity of glass to improve the meltability and formability of glass and increasing the strain point or Young's modulus of glass, and the total content of the component is 0 to 10%, preferably 0 to 8%, more preferably 0 to 6%, much more preferably 0 to 5%. However, when the total content of MgO+CaO+SrO+BaO is too high, the density or thermal expansion coefficient of glass becomes high, devitrification proof degrades, and ion exchange performance is apt to lower.

MgO is a component which lowers the viscosity of glass to enhance the meltability and the formability of the glass, or to enhance the strain point and the Young's modulus, and particularly shows a high effect of improving the ion exchange performance, among alkali earth metal oxides. The content of MgO is 0 to 10%, preferably 0 to 6%, more preferably 0 to 4%, and still more preferably 0 to 3%. However, when the content of MgO becomes too large, the density and the thermal expansion coefficient of the glass increase, and the glass tends to be devitrified.

CaO is a component which lowers the viscosity of glass to enhance the meltability and the formability of the glass, or to enhance the strain point and the Young's modulus, and particularly shows a high effect of improving the ion exchange performance, among alkali earth metal oxides. The content of CaO is 0 to 10%, preferably 0.1 to 8%, more preferably 0.5 to 6%, and still more preferably 1 to 4%. However, when the content of CaO becomes large, the density and the thermal expansion coefficient of glass increase, and the glass tends to be devitrified, and in addition, the ion exchange performance deteriorates in some cases. Note that when a small amount of CaO is added, the devitrification of glass may be improved.

SrO and BaO are components which lower the viscosity of glass to enhance the meltability and the formability of the glass, or to enhance the strain point and the Young's modulus, and each content thereof is 0 to 5%. When the content of SrO or BaO becomes too large, the ion exchange performance tends to deteriorate. Further, the density and the thermal expansion coefficient of the glass increase, and the glass tends to be devitrified. In particular, it is desired that the content of SrO be 3% or less (preferably 2% or less, 1% or less, or 0.5% or less, particularly 0.2% or less). Further, it is preferred that the content of BaO be 3% or less (preferably 2% or less, 1% or less, 0.8% or less, or 0.5% or less, and particularly preferably 0.2% or less).

When the total content of SrO+BaO (total content of SrO and BaO) is set to 0 to 5%, preferably 0 to 3%, more preferably 0 to 2.5%, much more preferably 0 to 2%, particularly preferably 0 to 1%, most preferably 0 to 0.2%, ion exchange performance is effectively improved. Because SrO+BaO has the function of inhibiting an ion exchange reaction as described above, when the total content of SrO+BaO is excessively high, the mechanical strength of tempered glass is hardly increased.

ZnO is a component which enhances the ion exchange performance, and in particular, shows a high effect of enhancing the compression stress value. Further, it is a component having an effect of lowering the viscosity without lowering the low-temperature viscosity of the glass, and the content thereof 0 to 10%, preferably 0 to 6%, more preferably 0 to 4%, and still more preferably 0 to 3%. However, when the content of ZnO becomes too large, the phase separation is caused, the devitrification property lowers, and the density becomes large.

When the value obtained by dividing the total content of MgO+CaO+SrO+BaO by the total content of $Li_2O+Na_2O+K_2O$, that is, the value (MgO+CaO+SrO+BaO)/($Li_2O+Na_2O+K_2O$) is large, there appears a tendency toward the reduction of the devitrification proof of glass. Therefore, it is desirable that the value (MgO+CaO+SrO+BaO)/($Li_2O+Na_2O+K_2O$) may be set to 0.5 mass % or less, preferably 0.4 mass % or less, more preferably 0.3 mass % or less. When the tempered glass of the present invention dose not contain $Li_2O$, $Na_2O$ and $K_2O$ as the glass composition, the content of (MgO+CaO+SrO+BaO) may be set within the range described in the above section [0058].

$ZrO_2$ is a component for improving ion exchange performance markedly and increasing the viscosity of glass around the liquidus viscosity and strain point of glass. The content of $ZrO_2$ is 0 to 10%, preferably 0 to 9%, more preferably 0.01 to 8%, much more preferably 0.1 to 7%, particularly preferably 1 to 7%. When the content of $ZrO_2$ is too high, the density and the thermal expansion coefficient of the glass increase, and the devitrification proof of glass may lower to an extreme extent.

$B_2O_3$ is a component which has the effect of reducing the liquidus temperature, viscosity, and density of glass and improving ion exchange performance, especially the compression stress value. The content of $B_2O_3$ is 0 to 10%, preferably 0 to 5%, more preferably 0 to 3%. When the content of $B_2O_3$ is too high, the surface of glass may be yellowed by ion exchange, the water resistance of glass may degrade, or the liquidus viscosity may lower. Further, when the content of $B_2O_3$ is too high, the thickness of the compression stress layer tends to become small. When an alkali metal component is contained in glass and the content of $B_2O_3$ is high, the alkali component is apt to vaporize while glass is molten. As a result, the vaporized alkali component adheres to brick or the like, whereby the service life of the brick may become short and the melting cost may greatly rise.

$TiO_2$ is a component for improving ion exchange performance and reducing the viscosity of glass. When the content of $TiO_2$ is too high, glass is colored or the devitrification proof of glass lowers. Therefore, the content of $TiO_2$ is set to 1% or less, preferably 0.5% or less, more preferably 0.1% or less.

$P_2O_5$ is a component which enhances the ion exchange performance of glass, and in particular, shows a high effect of increasing the thickness of the compression stress layer, and the content thereof is 0 to 8% (preferably 5% or less, 4% or less, 3% or less, or 2% or less, and particularly 1% or less). However, when the content of $P_2O_5$ is too large, the glass manifests phase separation, and the water resistance lowers.

As a fining agent, one kind or two or more kinds of materials selected from the group consisting of $As_2O_3$, $Sb_2O_3$, $CeO_2$, $SnO_2$, F, Cl, and $SO_3$ may be added in an amount of 0 to 3%. However, it is necessary to refrain as much as possible from the use of $As_2O_3$, $Sb_2O_3$, and F, in particular $As_2O_3$ and $Sb_2O_3$, from the viewpoint of the environment, and each content thereof may be limited to less than 0.1%. Therefore, $SnO_2$, $SO_3$, and Cl are preferable fining agents. $SnO_2$ is preferably contained in an amount of 0 to 1% or 0.01 to 0.5%, and more preferably 0.05 to 0.4%. Note that the preferable content of $SO_3$ and Cl have already been described.

Rare earth oxides such as $Nb_2O_5$ and $La_2O_3$ are components enhancing the Young's modulus of glass. However, the cost of the raw material itself is high, and when the rare earth oxides are contained in a large amount, the devitrification proof of the glass deteriorates. Therefore, it is desirable that the content thereof be limited to 3% or less, preferably 2% or less, more preferably 1% or less, still more preferably 0.5% or less, and particularly to 0.1% or less.

Oxides of transition metals such as Co and Ni cause intense coloration of glass, and lower the transmittance of glass. In particular, in the case of using the oxides of transition metals in a touch panel display, when the content thereof is large, the visibility of the touch panel display is deteriorated. Thus, it is desirable that the use amount of raw materials and/or cullet of the glass be adjusted so that the content of the oxides of transition metals is 0.5% or less (preferably 0.1% or less and more preferably 0.05% or less).

It is necessary to refrain as much as possible from the use of PbO and $Bi_2O_3$ from the viewpoint of the environment, and the content thereof may be limited to less than 0.1%.

The suitable content range of each component can be appropriately selected and used as a preferable glass composition range. Of those, examples of more preferred glass composition ranges include:
(1) a glass composition including, in terms of mass %, 50 to 75% of $SiO_2$, 12 to 22% of $Al_2O_3$, 0 to 10% of $Li_2O$, 8 to 15% of $Na_2O$, 0 to 10% of $K_2O$, 0 to 10% of MgO+CaO+SrO+BaO, and 0 to 5% of $B_2O_3$;
(2) a glass composition including, in terms of mass %, 50 to 75% of $SiO_2$, 12 to 22% of $Al_2O_3$, 0 to 10% of $Li_2O$, 8 to 15% of $Na_2O$, 0 to 6% of $K_2O$, 0 to 10% of MgO+CaO+SrO+BaO, and 0 to 5% of $B_2O_3$;
(3) a glass composition including, in terms of mass %, 50 to 75% of $SiO_2$, 12 to 22% of $Al_2O_3$, 0 to 4% of $Li_2O$, 8 to 15% of $Na_2O$, 1 to 5% of $K_2O$, 0 to 10% of MgO+CaO+SrO+BaO, 0 to 3% of MgO, 0 to 4% of BaO, and 0 to 5% of $B_2O_3$;
(4) a glass composition including, in terms of mass %, 45 to 75% of $SiO_2$, 1 to 25% of $Al_2O_3$, 0 to 10% of $Li_2O$, 0 to 15% of $Na_2O$, 0 to 10% of $K_2O$, 0 to 7% of SrO+BaO, 0 to 8% of $B_2O_3$, and 0 to 1% of $TiO_2$;
(5) a glass composition including, in terms of mass %, 45 to 75% of $SiO_2$, 1 to 22% of $Al_2O_3$, 0 to 10% of $Li_2O$, 3 to 15% of $Na_2O$, 0 to 10% of $K_2O$, 0 to 5% of SrO+BaO, 0 to 5% of $B_2O_3$, and 0 to 1% of $TiO_2$;
(6) a glass composition including, in terms of mass %, 50 to 75% of $SiO_2$, 12 to 22% of $Al_2O_3$, 0 to 5% of $Li_2O$, 6 to 15% of $Na_2O$, 1 to 8% of $K_2O$, 0 to 1% of SrO+BaO, 0 to 2% of $B_2O_3$, and 0 to 0.5% of $TiO_2$.
(7) a glass composition including, in terms of mass %, 45 to 75% of $SiO_2$, 12 to 25% of $Al_2O_3$, 0 to 1% of $Li_2O$, 0 to 15% of $Na_2O$, 0 to 10% of $K_2O$, 0 to 6% of $B_2O_3$, and 0 to 0.5% of $TiO_2$;

The tempered glass of the present invention has a strain point of preferably 450° C. or higher, more preferably 500° C. or higher, and still more preferably 520° C. or higher. When the strain point of glass is higher, the heat resistance of the glass is more excellent, and even if a thermal treatment is performed on the tempered glass, the compression stress layer does not disappear easily. When the strain point of the glass is high, stress relaxation does not occur easily during ion exchange treatment, thus, a high compression stress value can be obtained. In order to increase the strain point, the content of alkali metal oxides in the glass composition may be decreased, or the content of alkali earth metal oxides, $Al_2O_3$, $ZrO_2$, or $P_2O_5$ may be increased.

The thermal expansion coefficient of the tempered glass of the present invention is preferably 70 to $110 \times 10^{-7}$/° C., more preferably 75 to $100 \times 10^{-7}$/° C., much more preferably 80 to $100 \times 10^{-7}$/° C. When the thermal expansion coefficient of glass falls within the above range, it easily matches the thermal expansion coefficient of a member such as a metal or organic adhesive, thereby making it possible to prevent the separation of the member such as a metal or organic adhesive. To raise the thermal expansion coefficient, the content of an alkali metal oxide or an alkali earth metal oxide in the glass composition may be increased whereas, to lower the thermal expansion coefficient, the above content may be reduced.

In the tempered glass of the present invention, it is preferred that the liquidus temperature be 1,200° C. or lower, 1,050° C. or lower, 1,000° C. or lower, 950° C. or lower, or 900° C. or lower, and particularly 860° C. or lower. To reduce the liquidus temperature, the contents of $Na_2O$, $K_2O$, and $B_2O_3$ in the glass composition may be increased or the contents of $Al_2O_3$, $Li_2O$, MgO, ZnO, $TiO_2$, and $ZrO_2$ may be reduced.

In the tempered glass of the present invention, the liquidus viscosity of the glass is preferably $10^{4.0}$ dPa·s or more, more preferably $10^{4.5}$ dPa·s or more, still more preferably $10^{5.0}$ dPa·s or more, particularly preferably $10^{5.5}$ dPa·s or more, and most preferably $10^{6.0}$ dPa·s or more. To raise the liquidus temperature, the contents of $Na_2O$ and $K_2O$ in the glass composition may be increased or the contents of $Al_2O_3$, $Li_2O$, MgO, ZnO, $TiO_2$ and $ZrO_2$ may be reduced.

As the liquidus temperature becomes lower, the devitrification proof of glass and the formability of the glass substrate become more excellent. As the liquidus viscosity becomes higher, the devitrification proof of glass and the formability of the glass substrate become more excellent.

The density of the tempered glass of the present invention is preferably 2.7 g/cm$^3$ or less, more preferably 2.6 g/cm$^3$ or less, much more preferably 2.55 g/cm$^3$ or less. As the density becomes lower, the weight of glass becomes lighter. The term "density" is a value measured by a known Archimedes method. To reduce the density, the contents of $SiO_2$, $P_2O_5$, and $B_2O_3$ in the glass composition may be increased or the contents of an alkali metal oxide, an alkali earth metal oxide, ZnO, $ZrO_2$, and $TiO_2$ may be reduced.

In the tempered glass of the present invention, the temperature at a viscosity of $10^{2.5}$ dPa·s is preferably 1,500° C. or lower, more preferably 1,450° C. or lower, still more preferably 1,430° C. or lower, still more preferably 1,420° C. or lower, and particularly preferably 1,400° C. or lower. When the temperature at a viscosity of $10^{2.5}$ dPa·s is lower, burden on a glass production facility such as a melting furnace is smaller, and the bubble quality of the glass can be further improved. That is, when the temperature at the viscosity of $10^{2.5}$ dPa·s is lower, the glass can be produced at lower cost. In should be noted that the temperature at the viscosity of $10^{2.5}$ dPa·s corresponds to the glass melting temperature, and when the temperature at the viscosity of $10^{2.5}$ dPa·s is lower, the glass can be melted at lower temperature. To reduce the temperature at a viscosity of $10^{2.5}$ dPa·s, the contents of an alkali metal oxide, an alkali earth metal oxide, ZnO, $B_2O_3$, and $TiO_2$ may be increased or the contents of $SiO_2$ and $Al_2O_3$ may be reduced.

The tempered glass of the present invention is preferably used as a substrate for displays, cover glass for touch panel displays, cover glass for mobile phones, or a substrate or cover glass for solar cells. Because the tempered glass of the present invention meets the requirements (1) to (4) in the paragraph [0004] of this text and has high mechanical strength in particular, the tempered glass is suitable for the above applications.

The glass of the present invention contains, in terms of mass %, 45 to 75% of $SiO_2$, 3 to 25% of $Al_2O_3$, 0 to 10% of $B_2O_3$, 8 to 20% of $Na_2O$, and 0 to 10% of $K_2O$ as the glass composition and has a β-OH value of 0.01 to 0.5/mm. Because the technical features (preferred numeral ranges and preferred embodiment) of the glass of the present invention have already been described, a description of the glass is omitted for convenience's sake.

The method of manufacturing the tempered glass of the present invention is characterized by melting a glass raw material to ensure that the glass contains, in terms of mass %, 45 to 75% of $SiO_2$, 3 to 25% of $Al_2O_3$, 0 to 10% of $B_2O_3$, 8 to 20% of $Na_2O$, and 0 to 10% of $K_2O$, and has a β-OH value of 0.01 to 0.5/mm as the glass composition, forming the glass raw material into a substrate form, and carrying out ion exchange treatment to form a compression stress layer on the glass. Because the technical features (preferred numeral ranges and preferred embodiment) of the method of manufacturing tempered glass of the present invention have already been described, a description of the method is omitted for convenience's sake.

The tempered glass according to the present invention can be produced by placing a glass raw material which is prepared to have a predetermined glass composition in a continuous melting furnace, melting the glass raw material by heating at 1,500 to 1,600° C., fining the molten glass, feeding the molten glass to a forming apparatus to form the molten glass, and annealing the glass.

The tempered glass of present invention is preferably formed into a glass substrate by an overflow down draw method. In this way, a glass substrate which is not polished and has an excellent surface quality can be produced. The reason therefor is as follows: in the case of adopting the overflow down draw method, a surface to be the surface of the glass substrate does not come in direct contact with a trough-shaped refractory, and is formed in the form of free surface. Here, the overflow down draw method is a method in which a molten glass is allowed to overflow from both sides of a heat-resistant trough-shaped structure, and the overflow molten glasses are down-drawn downwardly while combining them at the lower end of the trough-shaped structure, to thereby produce a glass substrate. The structure and material of the trough-shaped structure are not particularly limited as long as they provide desired size and surface precision of the glass substrate and can realize quality usable in the glass substrate. Further, any method may be used to apply force to the glass substrate to perform downward down-draw. For example, there may be adopted a method involving rotating a heat resistant roll having sufficiently large width in the state of being in contact with a glass substrate, to thereby draw the glass substrate, and a method involving allowing several pairs of heat resistant rolls to come into contact with only end surfaces of the glass substrate to thereby draw the glass substrate. The tempered glass of the present invention is excellent in devitrification proof and has a viscosity property suitable for forming, thus, the glass substrate can be formed by the overflow down draw method.

Various forming methods can be adopted in addition to the overflow down draw method. For example, there are various forming methods, such as down draw methods (a slot down method and a re-draw method), a float method, a roll out method, and a press method. For example, if glass is formed by a press method, a small-sized glass substrate can be produced with good efficiency.

For producing the tempered glass, a tempering treatment needs to be performed after the glass is formed. It is desirable that the tempering treatment be performed by an ion exchange treatment. The ion exchange treatment can be performed, for example, by immersing the glass in a potassium nitrate solution at 400 to 550° C. for 1 to 8 hours. Optimum ion exchange conditions may be selected in view of glass viscosity property, application, plate thickness, tensile stress in the glass, and the like.

The glass may be cut before it is tempered. However, when the glass is cut after it is tempered, the production cost can be reduced.

EXAMPLE

Hereinafter, the present invention is described in detail based on examples.

Tables 1 and 2 show Examples of the present invention (Sample Nos. 1 to 12) and Comparative Examples (Sample Nos. 13 and 14). Note that Sample No. 13 indicates the standard of the β-OH value of a conventional product.

TABLE 1

| | | Example | | | | | | |
|---|---|---|---|---|---|---|---|---|
| | | No. 1 | No. 2 | No. 3 | No. 4 | No. 5 | No. 6 | No. 7 |
| Glass Composition (mass %) | $SiO_2$ | 57.3 | 57.3 | 57.3 | 57.3 | 57.3 | 57.3 | 57.3 |
| | $Al_2O_3$ | 13 | 13 | 13 | 13 | 13 | 13 | 13 |
| | $B_2O_3$ | 2 | 2 | 2 | 2 | 2 | 2 | 2 |
| | MgO | 2 | 2 | 2 | 2 | 2 | 2 | 2 |
| | CaO | 2 | 2 | 2 | 2 | 2 | 2 | 2 |
| | $Na_2O$ | 14.5 | 14.5 | 14.5 | 14.5 | 14.5 | 14.5 | 14.5 |
| | $K_2O$ | 4.9 | 4.9 | 4.9 | 4.9 | 4.9 | 4.9 | 4.9 |
| | $ZrO_2$ | 4 | 4 | 4 | 4 | 4 | 4 | 4 |
| | $SnO_2$ | 0.3 | 0.3 | 0.3 | 0.3 | 0.3 | 0.3 | 0.3 |
| | Cl (ppm) | — | — | — | — | — | — | — |
| | $SO_3$ (ppm) | — | — | — | — | — | — | — |
| β-OH value (/mm) | | 0.16 | 0.16 | 0.17 | 0.19 | 0.25 | 0.32 | 0.33 |
| Compression stress value (MPa) | | 790 | 777 | 790 | 775 | 775 | 775 | 771 |
| Depth of compression stress (μm) | | 48 | 49 | 50 | 49 | 48 | 47 | 47 |
| Compression stress value × depth of compression stress | | 37,920 | 38,073 | 39,500 | 37,975 | 37,200 | 36,425 | 36,237 |

TABLE 1-continued

| | Example | | | | | | |
|---|---|---|---|---|---|---|---|
| | No. 1 | No. 2 | No. 3 | No. 4 | No. 5 | No. 6 | No. 7 |
| Density (g/cm$^3$) | 2.542 | — | — | — | — | — | — |
| Ps (° C.) | 520 | — | — | — | — | — | — |
| Ta (° C.) | 560 | — | — | — | — | — | — |
| Ts (° C.) | 760 | — | — | — | — | — | — |
| 10$^4$ dPa·s (° C.) | 1,100 | — | — | — | — | — | — |
| 10$^3$ dPa·s (° C.) | 1,280 | — | — | — | — | — | — |
| 10$^{2.5}$ dPa·s (° C.) | 1,395 | — | — | — | — | — | — |
| Thermal expansion coefficient (×10$^{-7}$/° C.) | 100 | — | — | — | — | — | — |
| Liquidus temperature TL (° C.) | 855 | — | — | — | — | — | — |
| logηTL (dPa·s) | 6.2 | — | — | — | — | — | — |
| Young's modulus (GPa) | 75 | — | — | — | — | — | — |

TABLE 2

| | | Example | | | | | Comparative Example No. 13 (Conventional product) | No. 14 |
|---|---|---|---|---|---|---|---|---|
| | | No. 8 | No. 9 | No. 10 | No. 11 | No. 12 | | |
| Glass Composition (mass %) | SiO$_2$ | 57.3 | 57.3 | 57.3 | 55.9 | 54.2 | 57.3 | 57.3 |
| | Al$_2$O$_3$ | 13 | 13 | 13 | 13 | 13 | 13 | 13 |
| | B$_2$O$_3$ | 2 | 2 | 2 | 2 | 2 | 2 | 2 |
| | MgO | 2 | 2 | 2 | 3 | 3 | 2 | 2 |
| | CaO | 2 | 2 | 2 | 1 | 1 | 2 | 2 |
| | Na$_2$O | 14.5 | 14.5 | 14.5 | 15 | 15 | 14.5 | 14.5 |
| | K$_2$O | 4.9 | 4.9 | 4.9 | 5 | 5 | 4.9 | 4.9 |
| | ZrO$_2$ | 4 | 4 | 4 | 5 | 6.5 | 4 | 4 |
| | SnO$_2$ | 0.3 | 0.3 | 0.3 | 0.1 | 0.3 | 0.3 | 0.3 |
| | Cl (ppm) | — | 200 | — | 350 | 45 | — | — |
| | SO$_3$ (ppm) | — | — | 100 | 50 | 50 | — | — |
| β-OH value (/mm) | | 0.16 | 0.16 | 0.17 | 0.09 | 0.08 | 0.55 | 0.70 |
| Compression stress value (MPa) | | 790 | 777 | 790 | 1,050 | 1,100 | 690 | 640 |
| Depth of compression stress (μm) | | 48 | 49 | 50 | 37 | 36 | 42 | 39 |
| Compression stress value × depth of compression stress | | 37,920 | 38,073 | 39,500 | 38,850 | 39,600 | 28,980 | 24,960 |
| Density (g/cm$^3$) | | — | — | — | 2.55 | 2.57 | — | — |
| Ps (° C.) | | — | — | — | 538 | 549 | — | — |
| Ta (° C.) | | — | — | — | 580 | 592 | — | — |
| Ts (° C.) | | — | — | — | 791 | 804 | — | — |
| 10$^4$ dPa·s (° C.) | | — | — | — | 1,142 | 1,143 | — | — |
| 10$^3$ dPa·s (° C.) | | — | — | — | 1,317 | 1,307 | — | — |
| 10$^{2.5}$ dPa·s (° C.) | | — | — | — | 1,430 | 1,413 | — | — |
| Thermal expansion coefficient (×10$^{-7}$/° C.) | | — | — | — | 99 | 99 | — | — |
| Liquidus temperature TL (° C.) | | — | — | — | 895 | 930 | — | — |
| logηTL (dPa·s) | | — | — | — | 6.2 | 5.9 | — | — |

The samples in the tables were fabricated as follows. First, a glass batch or the like was prepared (for example, the ratio of an oxide raw material to an hydroxide raw material as Al$_2$O$_3$ introduction materials was changed) to achieve the glass composition and the β-OH value shown in the tables and melt at 1,580° C. for 8 hours by using a platinum pot. Thereafter, the molten glass was let flow over a carbon plate and formed into a substrate form. The characteristic properties of the obtained glass substrate were evaluated. The glass batch (excluding Cl and SO$_3$) of Sample No. 4 was used as the glass batch of Sample Nos. 9 and 10.

The β-OH value of glass was obtained from the following equation by measuring the transmittance of glass by FT-IR.

$$\beta\text{-OH value} = (1/X)\log 10(T_1/T_2)$$

X: thickness of glass (mm)

$T_1$: transmittance (%) at a reference wavelength of 3,846 cm$^{-1}$ $T_2$: minimum transmittance (%) at a hydroxyl group absorption wavelength of around 3,600 cm$^{-1}$ The density was measured by a known Archimedes method.

The strain point Ps and the annealing point Ta were measured based on a method of ASTM C336.

The softening point Ts was measured based on a method of ASTM C338.

Temperatures at viscosities 10$^{4.0}$ dPa·s, 10$^{3.0}$ dPa·s, and 10$^{2.5}$ dPa·s were measured by a platinum sphere pull up method.

The thermal expansion coefficient is a value measured by a dilatometer and shows an average thermal expansion coefficient in the temperature range of from 30 to 380° C.

As for the liquidus temperature: a glass powder which passes through a standard sieve of 30 mesh (mesh opening 500 μm) and remaining on 50 mesh (mesh opening 300 μm) was placed in a platinum boat, kept in a temperature gradient furnace for 24 hours, then, the crystal thereof deposited, and the temperature at this stage was referred to as liquidus temperature.

The liquidus viscosity is a value obtained by measuring the viscosity of glass at a liquidus temperature by a platinum ball pull up method.

Although untempered glass and tempered glass differ from each other microscopically in a glass composition on the surface layer of glass, they do not substantially differ from each other in the glass composition as a whole. Therefore, the untempered glass and tempered glass do not substantially differ from each other in characteristic properties such as density and viscosity.

After the both surfaces of Sample Nos. 1 to 14 were optically polished, ion exchange treatment was carried out. Ion exchange was carried out by immersing the samples in a $KNO_3$ molten salt at 440° C. for 6 hours. After the surfaces of the samples were washed, the number of interference fringes and the intervals between them were observed by a surface stress meter (FSM-6000, manufactured by Orihara Corporation) to calculate the compression stress value on the surface of glass and the thickness of the compression stress layer. This calculation was made based on the condition that the refractive index of each sample was 1.52 and the optical elastic constant was 28 [(nm/cm)/MPa].

Because Sample Nos. 1 to 12 had a β-OH value of 0.5/mm or less, the compression stress value on the surface was 700 MPa or more. Meanwhile, because Sample Nos. 13 and 14 had a β-OH value of more than 0.5/mm, the compression stress value on the surface was less than 700 MPa.

Note that, in Sample Nos. 1 to 12, a molten glass was flown, formed into a substrate shape, and then the substrate was optically polished before the ion exchange treatment, for convenience of explanation of the present invention. In the case of producing tempered glass in industrial scale, it is preferred that a glass substrate be formed by an overflow down draw method and the like, and an ion exchange treatment be carried out in the state that the both surfaces of the glass substrate are unpolished.

INDUSTRIAL APPLICABILITY

As is clear from the description above, the tempered glass of the present invention is suitable as a cover glass for a mobile phone, a digital camera, a PDA, or a touch panel display. The tempered glass of the present invention is expected to be applied to applications requiring high mechanical strength, for example, window glasses, magnetic disk substrates, flat panel display substrates, solar battery substrates and cover glasses, solid-state imaging device cover glasses, and tableware, in addition to the above-mentioned applications.

The invention claimed is:

1. A tempered glass having a compression stress layer, comprising, as a glass composition, in terms of mass %, 50 to 57.3% of $SiO_2$, 10 to 22% of $Al_2O_3$, 8 to 15% of $Na_2O$, 0 to 10% of MgO+CaO+SrO+BaO 1 to 30% of $Li_2O+Na_2O+K_2O$, and 0 to 5% $B_2O_3$, wherein the tempered glass has a thickness of 1.5 mm or less and a β-OH value of 0.01 to 0.5/mm.

2. The tempered glass according to claim 1, wherein the β-OH value of the tempered glass is 0.4/mm or less.

3. The tempered glass according to claim 1, wherein the glass composition further comprises, in terms of mass %, 0.0001 to 0.5 mass % of $SO_3$+Cl.

4. The tempered glass according to claim 1, wherein a compression stress value of the compression stress layer is 300 MPa or more, and a thickness of the compression stress layer is 1 μm or more.

5. The tempered glass according to claim 1, wherein the glass composition further comprises, in terms of mass %, less than 1% of $As_2O_3$.

6. The tempered glass according to claim 1, which has a thermal expansion coefficient of 60 to $110 \times 10^{-7}$/° C.

7. The tempered glass according to claim 1, wherein a tensile stress value in the tempered glass is 150 MPa or less.

8. The tempered glass according to claim 1, which has a liquidus viscosity of $10^{5.0}$ d·Pa s or more.

9. The tempered glass according to claim 1, which has a substrate shape.

10. The tempered glass according to claim 9, which has an unpolished surface.

11. The tempered glass according to claim 1, wherein the β-OH value of the tempered glass is 0.35/mm or less.

12. The tempered glass according to claim 1, which is used as a cover glass of a touch panel display.

13. The tempered glass according to claim 1, which is used as a cover glass of a mobile phone.

14. The tempered glass according to claim 1, which is used as a substrate or a cover glass of a solar battery.

15. The tempered glass according to claim 1, wherein the glass composition comprises 45 to 54.2% of $SiO_2$.

16. The tempered glass according to claim 1, wherein the glass composition comprises 0 to 3% of MgO.

17. The tempered glass according to claim 1, wherein the glass composition comprises 0 to 2% of MgO.

18. The tempered glass according to claim 1, which is free of $Li_2O$.

19. A method of producing a tempered glass, comprising the steps of: melting a glass raw material which is prepared to comprise, as a glass composition, in terms of mass %, 50 to 57.3% of $SiO_2$, 10 to 22% of $Al_2O_3$, 8 to 15% of $Na_2O$, 0 to 10% of MgO+CaO+SrO+BaO, 1 to 30% of $Li_2O+Na_2O+K_2O$, 0 to 5% $B_2O$ and a β-OH value of 0.01 to 0.5/mm; forming the resulting molten glass into a substrate having a thickness of 1.5 mm or less; and performing an ion exchange treatment to form a compression stress layer on the glass substrate.

20. The method of producing a tempered glass according to claim 19, wherein a cutting process is performed after the ion exchange treatment.

21. The method of producing a tempered glass according to claim 19, wherein the forming of the molten glass into the substrate is performed by an overflow down draw method.

* * * * *